United States Patent
Murali et al.

(10) Patent No.: US 11,042,600 B1
(45) Date of Patent: Jun. 22, 2021

(54) SYSTEM FOR CUSTOMIZING PRESENTATION OF A WEBPAGE

(71) Applicant: AMAZON TECHNOLOGIES, INC., Seattle, WA (US)

(72) Inventors: Vinod Murali, Seattle, WA (US); Vignesh Lakshminarayanan, Bellevue, WA (US); Leonardo Maia Carneiro De Novaes, Seattle, WA (US); Gianpierre Villagomez Saldana, Seattle, WA (US); Michael Carey Wexler, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 641 days.

(21) Appl. No.: 15/608,714

(22) Filed: May 30, 2017

(51) Int. Cl.
| | | |
|---|---|---|
| *G06F 16/957* | (2019.01) | |
| *G06F 16/954* | (2019.01) | |
| *G06F 16/958* | (2019.01) | |
| *G06F 16/9535* | (2019.01) | |

(52) U.S. Cl.
CPC ........ *G06F 16/9577* (2019.01); *G06F 16/954* (2019.01); *G06F 16/958* (2019.01); *G06F 16/957* (2019.01); *G06F 16/9535* (2019.01)

(58) Field of Classification Search
CPC ... G06F 16/9577; G06F 16/958; G06F 16/954
See application file for complete search history.

(56) References Cited

U.S. PATENT DOCUMENTS

| | | | | |
|---|---|---|---|---|
| 6,327,618 B1 * | 12/2001 | Ahlstrom | ............ | H04L 41/0213 370/254 |
| 7,216,298 B1 * | 5/2007 | Ballard | ............... | G06F 16/9577 715/760 |
| 7,613,726 B1 * | 11/2009 | Spivak | ................ | G06F 16/9535 |
| 8,166,155 B1 * | 4/2012 | Rachmeler | .......... | G06F 11/3438 709/224 |
| 9,712,331 B1 * | 7/2017 | Poh | ...................... | H04L 12/1403 |
| 9,933,929 B1 | 4/2018 | Pitsillides et al. | | |
| 2003/0217332 A1 * | 11/2003 | Smith | .................... | G06Q 30/02 715/234 |
| 2005/0268239 A1 * | 12/2005 | Seshadri | ............... | G06F 3/0482 715/747 |

(Continued)

OTHER PUBLICATIONS

Nakamura, Masato, et al., "A Dynamic Rearrangement Mechanism of Web Page Layouts Using Web Agents", Proceedings of the IEA/AIE, 2009, pp. 634-643.

(Continued)

*Primary Examiner* — Richard L Bowen
(74) *Attorney, Agent, or Firm* — Lindauer Law, PLLC

(57) ABSTRACT

Described are techniques for enabling webpages to be generated and customized based on rules created by a user. A user accessing a user interface may select a set of webpage features, the dimensions or other characteristics of the features, and a corresponding set of rule conditions, such as characteristics of a user device, user account, connection, or webpage. When a request to access a webpage is received, an existing body of rules is queried, and the particular rule that is satisfied by the request is determined. A webpage that includes the corresponding features and feature characteristics of the satisfied rule is generated and provided to the requesting device.

20 Claims, 6 Drawing Sheets

(56) References Cited

U.S. PATENT DOCUMENTS

| | | | |
|---|---|---|---|
| 2006/0036945 A1* | 2/2006 | Radtke | G06F 9/451 |
| | | | 715/708 |
| 2009/0327925 A1 | 12/2009 | Smet | |
| 2012/0151329 A1 | 6/2012 | Cordasco | |
| 2013/0067322 A1* | 3/2013 | Gould | G06F 17/00 |
| | | | 715/235 |
| 2013/0167028 A1* | 6/2013 | Goldman | H04N 21/4542 |
| | | | 715/716 |
| 2013/0227078 A1* | 8/2013 | Wei | H04L 67/2814 |
| | | | 709/219 |
| 2014/0082476 A1* | 3/2014 | Lundqvist | G06F 40/14 |
| | | | 715/234 |
| 2014/0280515 A1* | 9/2014 | Wei | H04L 67/2847 |
| | | | 709/203 |
| 2015/0039996 A1* | 2/2015 | Kwon | G06F 40/154 |
| | | | 715/234 |
| 2015/0142934 A1* | 5/2015 | Craine | H04L 67/125 |
| | | | 709/221 |
| 2015/0324490 A1* | 11/2015 | Page | G05B 19/4183 |
| | | | 700/98 |
| 2015/0378575 A1 | 12/2015 | Kaplinger et al. | |
| 2016/0085430 A1 | 3/2016 | Moran et al. | |
| 2017/0337321 A1 | 11/2017 | Hoford et al. | |
| 2018/0121560 A1 | 5/2018 | Chen et al. | |

OTHER PUBLICATIONS

Wei, Zheng, "Non-final Office Action dated Feb. 17, 2021", U.S. Appl. No. 16/213,858, The United States Patent and Trademark Office, dated Feb. 17, 2021.

* cited by examiner

SYSTEM FOR CUSTOMIZING PRESENTATION OF A WEBPAGE

BACKGROUND

Webpages and other types of user interfaces may include a variety of features, each having various characteristics depending on the purpose of the webpage.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
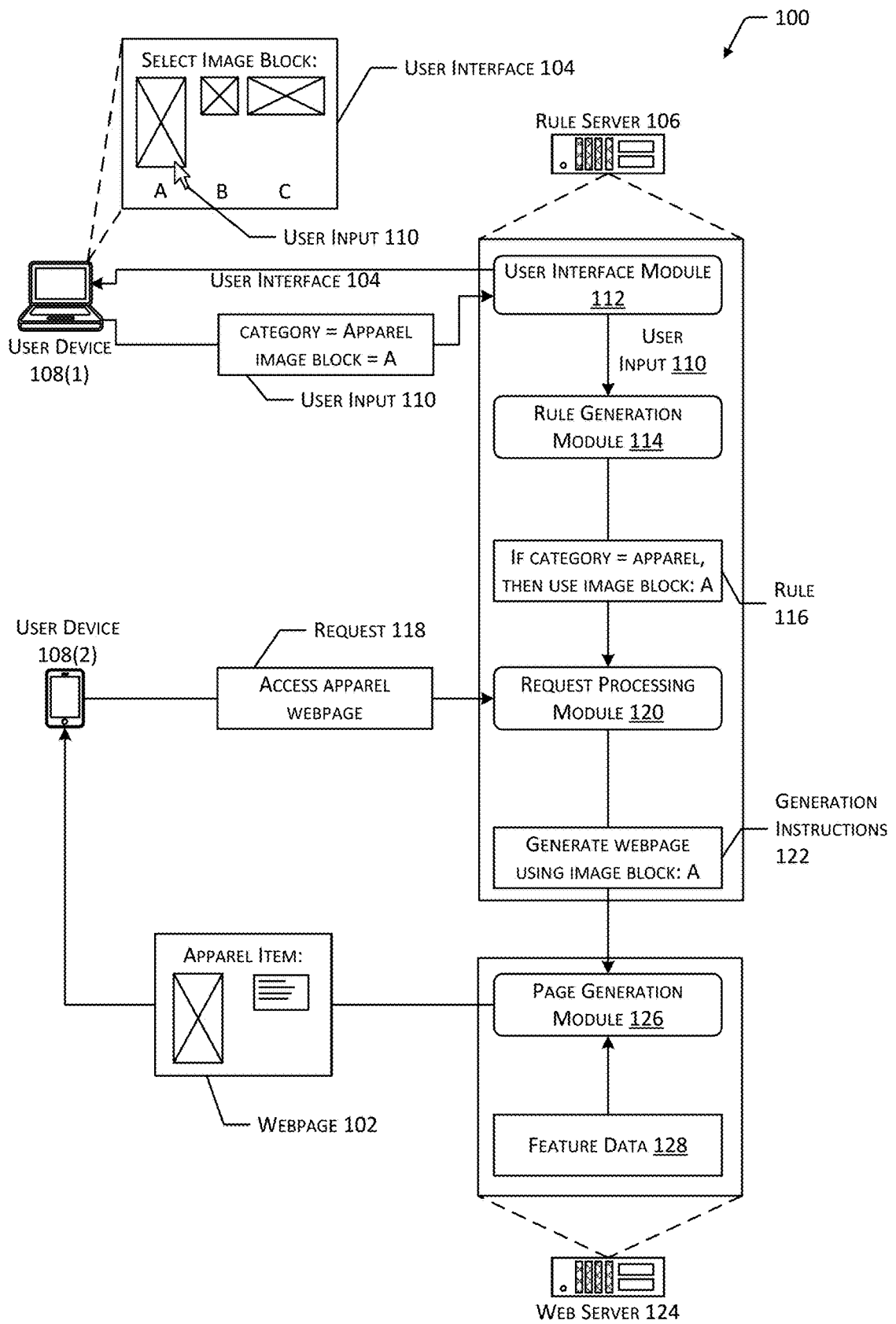
FIG. 1 depicts an implementation of a system for generating webpages using a user interface.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Webpages and other types of user interfaces may include a variety of features to convey information to a user, such as webpages within an online marketplace used to describe items available for purchase. For example, a webpage may include various combinations of alphanumeric data, image data, video data, audio data, or other types of data. Each feature presented in a webpage may include a variety of characteristics, such as the dimensions, location, color, or shape of the feature. For example, a large image within a webpage may be used to display an object, such as an article of clothing, where visual detail may be of importance to the user. Conversely, a smaller image may be used to display an object when the appearance of the object is not an important consideration. In some cases, an image of an object may be omitted when describing items for which appearance is not applicable or is wholly unimportant, such as when conveying information regarding software products. Other types of features may include textual descriptions, lists, tables, or other types of alphanumeric data describing technical specifications of products, which may be of significant importance when describing computers or other electronic items, but less important when describing clothing. Additional types of features may include user ratings, reviews, and comments, pricing, indications of similar items, and so forth. For example, a first arrangement of features that presents technical specifications of an item prior to images of the item may be used when presenting electronic items while a second arrangement of features that presents images and user reviews prior to technical specifications may be used when presenting apparel.

Typically, when a user creates a new webpage associated with one or more items available for purchase, the user must generate program code corresponding to the desired features for the webpage. For example, program code may control the particular features that are present, the placement of the features, and the dimensions, location, arrangement, or other characteristics of the features. However, in many cases, a webpage created for a particular type of item may be less suitable for use with other types of items, or a webpage created for use during particular circumstances may be unsuitable for use during other circumstances. For example, webpages describing items associated with a first category, such as apparel, may convey useful information more effectively if images of the items are displayed proximate to the top of the webpage, prior to other features, and if the images are enlarged, while technical specifications for the items are omitted, deemphasized, or displayed subsequent to other content. As another example, webpages describing items associated with a second category, such as electronics, may be more useful to consumers if the webpage includes an enlarged table describing technical specifications that is presented near the top of the webpage. As yet another example, webpages describing a third category of items, such as video games, may be useful to consumers if the webpages include video content illustrating gameplay. However, during times when high latency is observed, transmitting video content to a user may cause a significant delay in presenting the webpage, and it may be beneficial to instead display only images or alphanumeric data during such times. In each of such examples, a user generating webpages for use with multiple types of items or under different sets of circumstances may be required to separately provide program code for each webpage.

Described in this disclosure are techniques for enabling the generation of webpages and other types of user interfaces by enabling a user to select a set of rule conditions and a corresponding set of existing feature characteristics, such that when the rule conditions are satisfied, a webpage containing the selected feature characteristics may be automatically generated. A user interface may be provided to a device accessed by a first user. The user interface may present multiple feature characteristics for features of a webpage. For example, user input provided to the user interface may be used to select one or more features to be included within a webpage. Continuing the example, a feature may include an image box (e.g., a region for outputting image data), a text box (e.g., a region for outputting alphanumeric data), a region for outputting video data, an audio output, a haptic output, an olfactory output, and so forth. The user input may also indicate one or more characteristics for each feature. The characteristics for each feature may include the dimensions or physical appearance of the features. For example, feature characteristics may include the dimensions of a text box or image box, a visual shape, color, or other style of a feature, and so forth. Feature characteristics may also include characteristics associated with the layout or arrangement of features. For example, feature characteristics may include the placement of a feature within a webpage, the order in which features are presented, or the placement of a feature relative to one or more other features.

The user input may also indicate particular rule conditions for a set of feature characteristics. Rule conditions may indicate a characteristic of a user device attempting to access the webpage, a characteristic of the connection with the user device, a characteristic of a user account requesting access to the webpage, or a characteristic of the webpage itself. For example, a rule condition may be associated with the category of a webpage. Continuing the example, a rule condition may indicate a category of the webpage, such as "apparel", responsive to which a particular set of feature characteristics, such as a large or elongated image box, may be included in a generated webpage. As another example, a rule condition may indicate a characteristic of a connection with a user device, such as a threshold quantity of latency. If the quantity of latency is less than the threshold quantity, a webpage that includes video data may be generated, but if the quantity of latency exceeds the threshold quantity, a webpage that lacks video data but includes alternate data, such as one or more images, may be generated. As yet another example, a rule condition may indicate that if a user account indicates that a user has impaired vision, or that the user device attempting to access the webpage is executing a screen reading or text-to-speech application, a webpage that does not include image or video data and that includes simplified alphanumeric data may be generated. In some cases, a user may select multiple sets of feature characteristics, each corresponding to a particular set of rule conditions, enabling the user to generate multiple versions of a webpage that may be output responsive to specific sets of rule conditions that are satisfied. In some implementations, layouts associated with a webpage may be precomputed (e.g., generated) based on user input and stored for subsequent access, such that when a request to access the webpage is received and each of the rule conditions for a particular version of the webpage is satisfied, the precomputed data may be used to generate the webpage without incurring the latency involved in the generation of the precomputed data.

In some implementations, correspondence between constraint data and the rule conditions and feature characteristics indicated by the user input may be determined. Constraint data may indicate particular requirements or limitations associated with generation of a webpage. For example, constraint data may indicate that certain features, such as an item name or item price, must be present in a webpage, independent of the features selected by a user. As another example, constraint data may indicate that certain features must be positioned before or after certain other features, or within certain regions of a webpage. As yet another example, constraint data may indicate a minimum or maximum count of features to be included in a webpage, certain features that may not be included if other features are present, certain features that are required to be included if other features are present, and so forth. Constraint data may also indicate limitations regarding dimensions of certain features relative to other features. In some cases, constraint data may indicate certain combinations of rule conditions and feature characteristics that may not be used or that must be present. For example, certain enlarged feature characteristics may not be properly displayed using certain types of display devices, such as screens on mobile devices, colorful feature characteristics may not be properly displayed on monochrome display devices, or audio output may not be provided to user devices that lack audio output devices. Determining correspondence between the constraint data and the user input may include determining that the user input includes one or more feature characteristics or rule conditions that are indicated as required in the constraint data, and lacks feature characteristics or rule conditions that are indicated as prohibited in the constraint data. In cases where a lack of correspondence between the constraint data and the user input exists, a notification may be provided to the user generating the webpage. In some implementations, a constraint may be associated with an owner, such as a user that generated the constraint, and notifications may be provided to the owner when a constraint is violated. As another example, if two sets of rule conditions are able to be satisfied simultaneously, a notification may be generated indicating the conflicting rule conditions or corresponding feature characteristics. In some implementations, one or more features of a webpage that are not indicated in the user input may be included in the webpage using a set of default feature characteristics. For example, in the absence of user input corresponding to the dimensions or stylistic characteristics of a product name or price, a product name and price may be included in the webpage in a default location and presented using a default font.

In some implementations, the user interface may provide recommendations to a user selecting feature characteristics. For example, if the user input indicates a specific rule condition that is not commonly satisfied, a notification may be generated indicating that the selected set of feature characteristics is unlikely to be used due to the selected rule condition. As another example, if a particular set of feature characteristics has previously resulted in a substantial quantity of purchases, user interactions, page views, or viewing time, the user interface may generate a notification recommending particular combinations of feature characteristics.

After generation of one or more versions of a webpage, when a request to access the webpage is received, correspondence between characteristics of the request and the rule conditions may be determined. For example, after receiving the request, characteristics of the device providing the request may be determined. Continuing the example, characteristics of the device may include an indication of one or more hardware components associated with the device, such as a display size, an indication of one or more software components executing on the device, such as a screen reading program, or combinations of hardware and software components. As another example, characteristics of a connection with the device providing the request, such as latency, a packet error rate, a data throughput value, or other metric values may be determined. As yet another example, characteristics of a user account associated with the request, such as demographic or geographic information, may be determined. In some cases, characteristics of the webpage itself, such as a category associated with the webpage, may also be determined. Determining correspondence between the request parameters and the rule conditions may include determining that each rule condition of a particular rule matches at least one request parameter. If the characteristics determined based on the request correspond to a set of rule conditions selected by the user that generated the webpage, then a webpage that includes the set of feature characteristics that correspond to the rule conditions may be provided in response to the request. If the characteristics do not correspond to any of the selected sets of rule conditions, then a default version of the webpage may be provided responsive to the request.

Implementations within the scope of the present disclosure may thereby enable a user to efficiently generate one or more versions of a webpage using an existing set of feature characteristics by selecting sets of rule conditions and corresponding sets of feature characteristics. Then, if a request satisfies a set of rule conditions, a webpage including the corresponding set of feature characteristics may be provided responsive to the request. Generation of webpages in this manner may enable a user to create one or multiple versions of a webpage rapidly by enabling a user to select rule conditions and feature characteristics rather than requiring the user to generate program code.

FIG. 1 depicts an implementation of a system 100 that may be used to generate one or more webpages 102 based on various feature characteristics and corresponding rule conditions selected via a user interface 104. A rule server 106 may be used to provide a user interface 104 to a user device 108(1) associated with a user attempting to generate a webpage 102. While FIG. 1 depicts a single rule server 106, the rule server 106 may include any number of computing devices. Additionally, the rule server 106 may include any types of computing devices including, without limitation, servers, personal computers, portable computing devices, automotive computing devices, gaming systems, smart televisions, set-top boxes, and so forth. While FIG. 1 depicts a single user device 108(1) receiving the user interface 104 from the rule server 106, the user device 108(1) may include any number and any type of computing devices including, without limitation, the types of computing devices described with regard to the rule server 106. Additionally, the rule server 106 may be configured to provide user interfaces 104 to multiple user devices 108 sequentially or simultaneously.

The user interface 104 may be configured for output using the user device 108(1) and for receiving user input 110. The user input 110 may select or indicate one or more rule conditions. Rule conditions may include characteristics of user devices 108 or user accounts accessing a webpage 102, characteristics connections with the user devices 108, or characteristics of the webpage 102, itself. For example, a rule condition may include an indication of a category associated with the webpage 102, such as "Apparel". User input 110 may also select or indicate one or more features for inclusion in the webpage 102, and one or more feature characteristics for the selected features. For example, a feature may include an image block, a text block, one or more audio, video, haptic, or olfactory elements, and so forth. A feature characteristic may include dimensions, shapes, colors, or other visible, audible, or tactile traits of a feature. Feature characteristics may also include the location of a feature within a webpage 102 or relative to other features. Continuing the example, FIG. 1 depicts the user interface 104 outputting three example image blocks for selection, each image block having different dimensions. User input 110 selecting the first of the three image blocks is also depicted. The user interface 104 may include one or more lists, menus, or other types of output that indicate multiple rule conditions or multiple feature characteristics. In some implementations, the user interface 104 may be searchable. In other implementations, the user interface 104 may be configured to provide recommendations regarding particular rule conditions or feature characteristics.

A user interface module 112 associated with the rule server 106 may be used to generate and provide user interfaces 104 to user devices 108. The user interface module 112 may also receive and process user input 110 from user devices. A rule generation module 114 associated with the rule server 106 may process data indicative of the user input 110 to generate one or more rules 116 based on the user input 110. A rule 116 may associate one or more rule conditions with one or more corresponding feature characteristics. For example, a rule 116 may indicate that if the category associated with a webpage 102 is "Apparel", then an image block having particular dimensions is to be included in the webpage 102. As discussed previously, other rule conditions may be associated with characteristics of the user device 108 or user account accessing the webpage 102 or characteristics of the connection with the user device 108, such as latency. Additionally, as discussed previously, other feature characteristics may be associated with the location of features within the webpage 102, the location of features relative to other features, the shape, color, font, or other visual characteristics of the features, and so forth. While FIG. 1 depicts an example rule 116 having a single rule condition and a single feature characteristic, a rule 116 may associate any number and any type of rule conditions with any number and any type of feature characteristics. Additionally, while FIG. 1 depicts a single rule 116, user input 110 may be used to generate multiple rules 116, each rule 116 corresponding to a particular version of a webpage 102. For example, a first version of a webpage 102 may be output if a first set of rule conditions are satisfied, while a second version of the webpage 102 may be output if a second set of rule conditions are satisfied. Continuing the example, a first version of a webpage 102 that includes video data may be output if the latency associated with a connection with a user device 108 accessing the webpage 102 is less than a threshold quantity of latency, while a second version of the webpage 102 that lacks video data may be output if the latency exceeds the threshold value. As another example, a first version of a webpage 102 that includes an enlarged image block and a table of technical specifications for an item near the top of the webpage 102 may be displayed when the webpage 102 is accessed by a user account that has not previously purchased the item. A second version of the webpage 102 that includes a large section associated with user reviews positioned near the top of the webpage 102 may be output when the webpage 102 is accessed by a user account associated with a previous purchase of the item.

In some implementations, the rule generation module 114 may validate one or more rules 116 before storing the rule(s) 116 for future use. For example, the rule generation module 114 may determine that a new rule 116 based on user input 110 does not conflict with any existing rules 116. Continuing the example, the rule generation module 114 may determine that it is not possible to simultaneously satisfy the rule conditions associated with multiple rules 116 prior to storing a newly generated rule 116. In other implementations, the rule generation module 114 may determine that a rule 116 does not conflict with existing constraint data prior to storing the rule 116. For example, constraint data may indicate that all pages associated with items available for purchase must include an item name and price. A rule 116 that omits these features may be discarded, or default values for these features may be automatically included in the resulting webpage 102. As another example, the constraint data may indicate two feature characteristics that may not both be present in a webpage 102. Continuing the example, an image block having certain dimensions may not be usable alongside a text block having dimensions that would cause the two features to overlap.

After generation of one or more rules 116, the rule server 106 may receive a request 118 to access a webpage 102. For example, FIG. 1 depicts a user device 108(2) providing a request 118 to access an "apparel" webpage 102 to a request processing module 120 associated with the rule server 106. The request processing module 120 may determine one or more characteristics of the user device 108(2), a user account associated with the user device 108(2), a connection associated with the user device 108(2), or the webpage 102 associated with the request 108. The request processing module 120 may determine correspondence between the determined characteristics and the rule(s) 116 generated by the rule generation module 114. Correspondence between the characteristics and the rule(s) 116 may indicate whether the request 118 satisfies each of the rule conditions associated with a rule 116. For example, FIG. 1 depicts a rule 116 in which if the category of the webpage 102 is "apparel", then a particular image block "A" is to be included in the webpage 102. Based on correspondence between the request 118, which indicates the category "apparel", and the rule 116, the request processing module 120 may determine that the rule conditions for the rule 116 are satisfied by the request 118. The request processing module 120 may then determine the set of feature characteristics that correspond to the rule 116 and provide generation instructions 122 indicative of the feature characteristics to a web server 124. While FIG. 1 depicts the web server 124 as a separate computing device from the rule server 106, in other implementations, the functions of the web server 124 and rule server 106 may be performed by a single computing device or group of computing devices. Additionally, while FIG. 1 depicts the web server 124 as a single server, in other implementations, the web server 124 may include any number and any type of computing devices including, without limitation, the types of computing devices described with regard to the rule server 106. Further, while FIG. 1 depicts the user device 108(2) providing a request 118 to the rule server 106, in other implementations, the request 118 may be provided to the web server 124 which may in turn provide data indicative of the request 118 to the rule server 106 to cause the rule server 106 to provide generation instructions 122.

A page generation module 126 associated with the web server 124 may receive and process the generation instructions 122. The generation instructions 122 may indicate particular features and corresponding feature characteristics determined based on the rule 116. The page generation module 126 may determine correspondence between the generation instructions 122 and feature data 128 indicative of existing features and feature characteristics that may be included in webpages 102. The page generation module 126 may then generate a webpage 102 that includes the features and feature characteristics that correspond to the generation instructions 122. In some implementations, if the generation instructions 122 do not specify particular features or feature characteristics, the page generation module 126 may also include one or more default features in the webpage 102 and may provide one or more of the features with default feature characteristics. While in some cases, the web server 124 may render the webpage 102 and provide the webpage 102 to the user device 108(2) for output, in other cases, the web server 124 may provide data indicative of the webpage 102 to the user device 108(2), or to another computing device in communication with the web server 124, and the receiving device may render the webpage 102.

Figure 2:
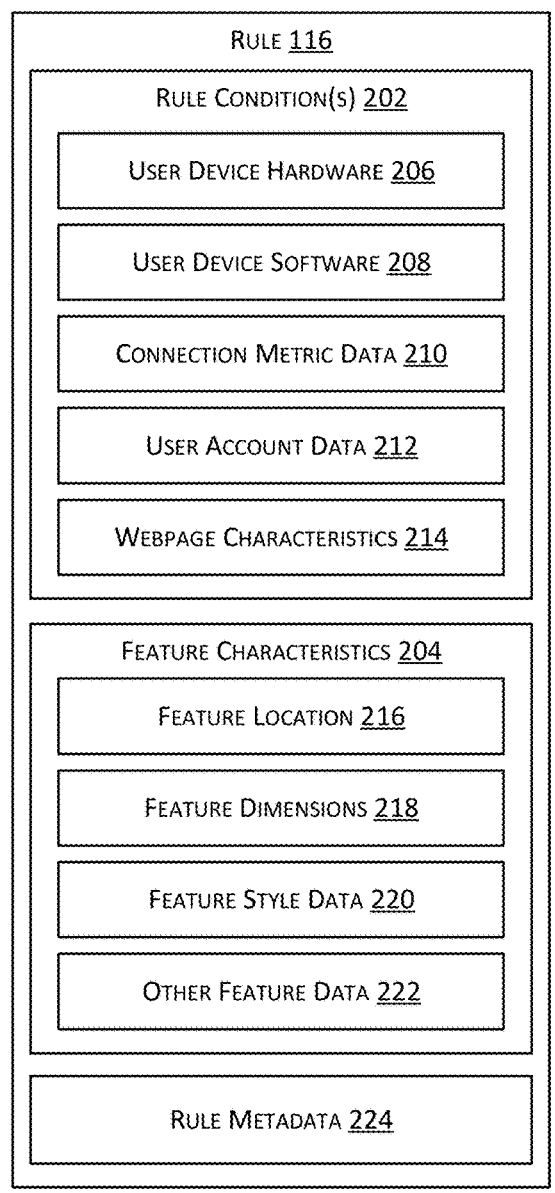
FIG. 2 is a block diagram depicting one possible implementation of a rule within the present disclosure.

FIG. 2 is a block diagram 200 depicting one possible implementation of a rule 116 within the scope of the present disclosure. As discussed with regard to FIG. 1, a rule 116 may associate one or more rule conditions 202 with one or more corresponding feature characteristics 204. If the characteristics associated with a received request 118 to access a webpage 102 correspond to each rule condition 202 of a rule 116, then a webpage 102 that includes the feature characteristics 204 that correspond to the rule conditions 202 may be generated and provided responsive to the request 118. In cases where a received request does not correspond to any existing rules 116, a webpage 102 may be generated that includes a default set of feature characteristics 204. In other implementations, access to a webpage 102 may be denied if a request 118 does not correspond to any existing rules 116.

Rule conditions 202 may include any manner of data, information, or characteristics associated with a user device 108 providing a request 118, a connection with the user device 108, or the webpage 102 associated with the request 118. In some implementations, the rule conditions 202 may include data indicative of user device hardware 206. For example, the rule conditions 202 may indicate particular types of display devices, such as a screen having a size greater than or less than a threshold size. Continuing the example, the rule conditions 202 may indicate that if the user device hardware 206 includes a screen sized for use with a mobile device, a first version of the webpage 102 having images and other content sized for viewing on a mobile device may be generated. However, if the size of the display device is greater than a threshold size, a second version of the webpage 102 that includes larger content may be generated. As another example, the rule conditions 202 may indicate that if a display device is incapable of displaying one or more particular colors, a first version of the webpage 102 may be generated. Otherwise, a second version may be generated. As yet another example, the rule conditions may indicate that if a user device 108 possesses a speaker or other audio output mechanism, the webpage 102 may include an audio output. However, if the user device 108 lacks an audio output mechanism, a version of the webpage 102 that lacks audio content may be provided.

The rule conditions 202 may also include data indicative of user device software 208. For example, if a user device 108 is executing a particular application, such as a screen reading or text-to-speech application, a first version of the webpage 102 lacking images or formatted text such as tables may be generated and provided to the user device 108. However, if the user device 108 is not executing such an application, a second version of the webpage 102 that includes large images and tables may be generated. As another example, if a user devices is executing a particular browser application, a version of the webpage 102 having feature characteristics 204 that correspond to the capabilities of the browser application may be generated. User device software 208 may also include programs or applications that may be used to modify sound or display settings of a user device 108. For example, if it is determined that the volume setting for a user device 108 is muted or is less than a threshold volume, a version of the webpage 102 that does not include audio content may be generated. Similarly, if it is determined that the display settings for the user device 108 deviate from one or more threshold settings, a particular version of the webpage 102 suitable for display by the user device 108 may be generated.

The rule conditions 202 may also include connection metric data 210. Connection metric data 210 may include data indicative of the status or characteristics of a connection with a user device 108. For example, the connection metric data 208 may include a threshold quantity of latency. A first version of a webpage 102 having video and audio content may be generated if the latency for the connection to the user device 108 is less than the threshold quantity, while a second version of the webpage 102 having images in place of the video content may be generated if the latency exceeds the threshold quantity. Other connection metric data 210 may include data indicative of a packet error rate, signal to noise ratio, physical data rate, data throughput value, and so forth, that may indicate the quality and reliability of a connection with the user device 108.

The rule conditions 202 may additionally include user account data 212. User account data 212 may include demographic and geographic information regarding a user or user device 108, such as a user's name, age, gender, marital status, level of education, occupation, residential address, business address, and so forth. For example, a first version of a webpage 102 may be provided to users residing in a first location, while a second version of the webpage 102 may be provided to users residing in a second location. User account data 212 may also include an indication of one or more memberships or associations of a user. For example, the user account data 212 may indicate that the user is associated with a purchasing program that provides free or discounted shipping costs when purchasing selected items. A rule condition 202 may indicate that a webpage 102 that prominently displays the free or discounted shipping costs is to be provided if the user account data 212 indicates such a program membership, while a different version of the webpage 102 may be provided to other users. User account data 212 may additionally include indications of previous user interactions. For example, the user account data 212 may indicate one or more of a purchase history, browsing history, or search history associated with a user account. Continuing the example, a first version of a webpage 102 that includes a larger section displaying user reviews may be provided if the user account data 212 indicates that a user has previously purchased an item associated with the webpage 102. A second version of the webpage 102 that includes a larger section displaying technical aspects of the item may be provided if the user has not previously purchased the item.

The rule conditions 202 may also include an indication of one or more webpage characteristics 214. Webpage characteristics 214 may include an indication of a type or category associated with the webpage 102, such as an indication of a category of items available for purchase. For example, a rule 116 may cause a first version of a webpage 102 having a large table indicating technical specifications to be displayed when the category associated with the webpage 102 is "computers", and a second version of a webpage 102 having a large image depicting the item when the category associated with the webpage 102 is "apparel". Other webpage characteristics 214 may include types of data or features included in the webpage 102. For example, a rule 116 may indicate that if a webpage 102 includes certain strings of alphanumeric data, the text block containing this alphanumeric data is to be positioned at the top of the webpage 102. Other webpage characteristics 214 may include an indication that a layout associated with the webpage 102 has been generated and stored to enable efficient retrieval if the rule conditions 202 for the rule 116 are satisfied. For example, a rule 116 may indicate that if a layout associated with a webpage 102 has been previously precomputed, the webpage 102 may be provided to a user device 108 responsive to a request 118 independent of the latency associated with the connection with the user device 108. However, the rule 116 may cause an alternate version of the webpage 102 that includes less data to be provided if the webpage 102 has not been previously generated and stored. Webpage characteristics 214 may also include a geographical association of a webpage 102. For example, a webpage 102 may include multiple instances, each presented in a different country. Certain feature characteristics 204 may be presented when a webpage 102 associated with a first country is accessed, while a different set of feature characteristics may be presented if a webpage 102 associated with a second country is accessed.

A rule 116 may include any number of rule conditions 202 and any combination of types of rule conditions 202 including the example types of rule conditions 202 illustrated in FIG. 2, as well as other types of rule conditions 202. If the information determined responsive to a request 118 corresponds to each rule condition 202 of a rule 116, a webpage 102 having the corresponding set of feature characteristics 204 may be provided to the user device 108 associated with the request 118.

Feature characteristics 204 may include the placement, arrangement, dimensions, shape, color, font, resolution, or any other qualities that may affect the visual appearance of image, video, or alphanumeric data, the audible perception of audio data, the tactile perception of haptic data, and so forth. For example, feature characteristics 204 may include one or more feature locations 216. Feature locations 216 may include the placement of one or more features within a webpage 102, such as by specifying particular coordinates within a webpage 102, a distance from one or more edges of the webpage 102, and so forth. Feature locations 216 may also include the order or arrangement of one or more features. For example, a feature characteristic 204 may place an image of an item before user reviews associated with an item. Feature locations 216 may additionally include the placement of particular features relative to other features. For example, a feature characteristic 204 may place a particular feature a selected distance in a selected direction from another feature.

Feature characteristics 204 may also include feature dimensions 218. Feature dimensions 218 may include a size of one or more features, such as the length and width of an image block, text block, region for outputting video content, or other type of feature, such as a search interface, button, and so forth. For example, a webpage 102 may include a text block or image block having a large size when a user device 108 having a large display provides a request 118 or when the category associated with an item is associated with a visual product, and a text block or image block having a smaller size in other cases.

Feature characteristics 204 may further include feature style data 220. Feature style data 220 may affect the color, shape, resolution, or other visible characteristics of image data, video data, or alphanumeric data. For example, feature style data 220 may affect the color of an image, the shape of a text block or image block, the font of text within a text block, margins within a text block, and so forth. Feature style data 220 may also include the volume or other audible qualities of audio data, the intensity or frequency of a haptic output, and so forth.

Other feature data 222 may include other traits of visible, audible, haptic, or olfactory output that may be modified. Other feature data 222 may also include default sets of features and default sets of feature characteristics 204. For example, a default set of features may indicate particular features that are present in a webpage 102 independent of user input 110, or that pare included in a webpage 102 in the absence of user input 110 associated with the particular features. A default set of feature characteristics 204 may include particular locations, dimensions, or stylistic elements associated with particular features that may be used in the absence of user input 110. For example, if no user input 110 selecting a particular size of image block is received, a webpage 102 including an image block having default feature dimensions 218 may be generated.

A rule 116 may also include rule metadata 224. Rule metadata 224 may indicate a creator of a rule 116. For example, the creator of a rule 116 may receive notifications indicative of instances when the rule 116 is satisfied or violated, if a conflicting rule 116 is generated, if another user modifies or attempts to modify the rule 116, and so forth. Continuing the example, the creator of a rule 116 may have sufficient permissions or other access credentials to modify the rule 116, while other users may lack such permissions unless specifically designated. As such, the rule metadata 224 may also include an indication of permissions or other types of access rights provided to one or more users. For example, certain users may be permitted to view a rule 116, other users may be permitted to modify certain portions of the rule 116, still other users may be permitted to modify all portions of the rule 116, and other users may be permitted to delete the rule 116 or modify the permissions granted to other users. Rule metadata 224 may also include metrics associated with a rule 116, such as a count of instances when the rule 116 is satisfied, a count of instances when the rule 116 is not satisfied, a count of instances when particular rule conditions 202 are satisfied or not satisfied, a count of instances when particular feature characteristics 204 are presented, data indicative of the particular user devices or user accounts that satisfy or fail to satisfy the rule 116, and so forth.

Figure 3:
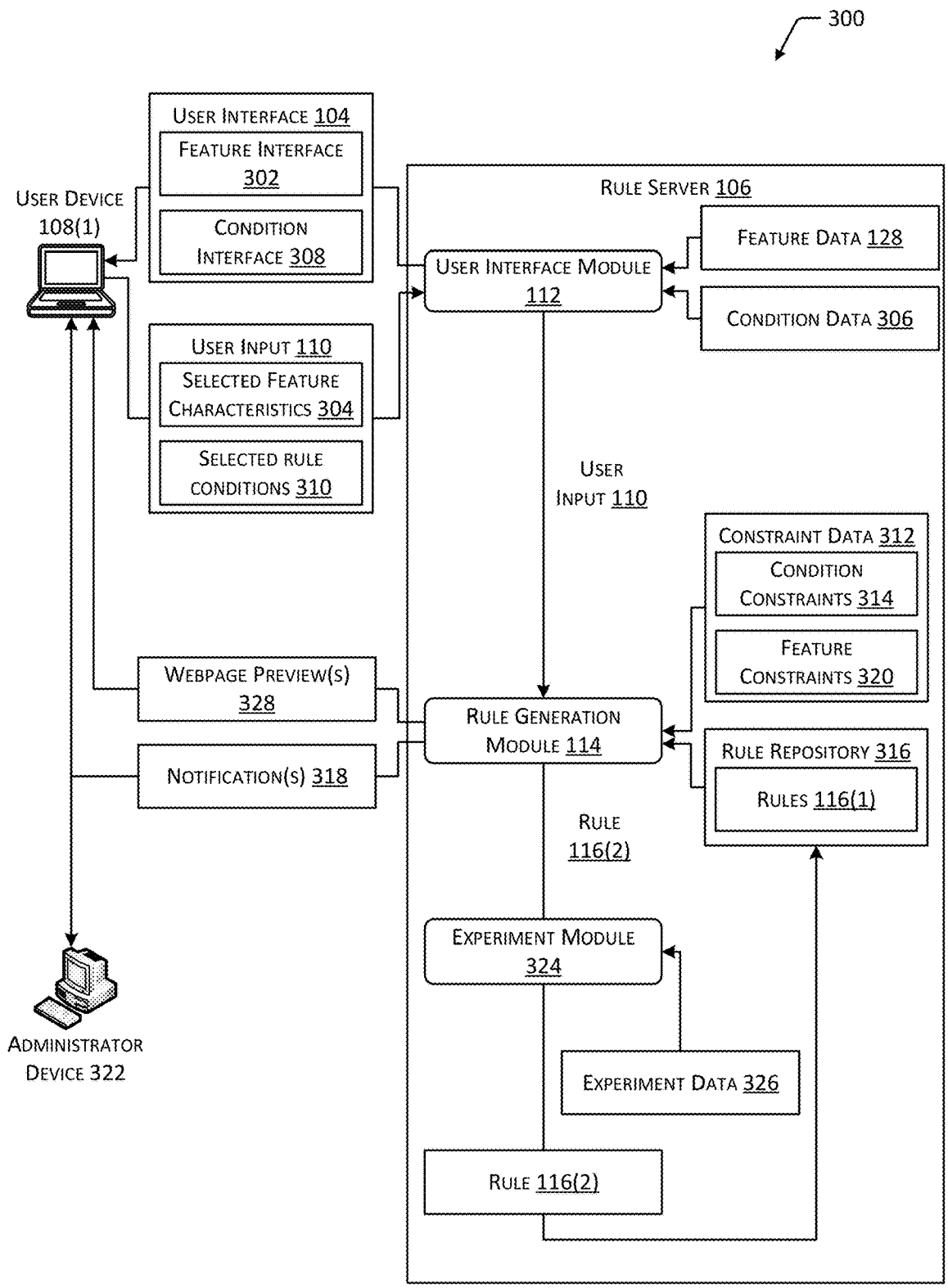
FIG. 3 is a block diagram depicting an implementation of a rule server within the present disclosure.

FIG. 3 is a block diagram 300 depicting one implementation of a rule server 106 within the present disclosure. As described with regard to FIG. 1, the rule server 106 may include a user interface module 112 that may be used to generate one or more user interfaces 104 for use creating rules 116. The user interface module 112 may access feature data 128, which may include an indication of one or more features that may be included in a webpage 102 and feature characteristics 204 that correspond to the features. Features and feature characteristics 204 may be presented in the user interface 104 as one or more feature interfaces 302. For example, a feature interface 302 may include a menu, table, list, search interface, or other visible or audible output associated with the user interface 104 that may indicate particular features and feature characteristics 204 to a user. User input 110 associated with the feature interface 302 may include one or more selected feature characteristics 304, which may be received by the user interface module 112. The user interface module 112 may also access condition data 306, which may include an indication of one or more rule conditions 202 that may be included in a rule 116. Rule conditions 202 may be presented in the user interface 104 as one or more condition interfaces 308. A condition interface 308 may include one or more menus, tables, lists, search interfaces, or other elements for presenting rule conditions 202 and receiving user input 110 indicating particular selected rule conditions 310.

A rule generation module 114 associated with the rules server 106 may receive data indicative of at least a portion of the user input 110. The rule generation module may determine correspondence between the user input 110 and constraint data 312 indicative of limitations regarding the generation of rules 116. For example, the constraint data 312 may include one or more condition constraints 314. In some implementations, condition constraints 314 may indicate one or more rule conditions 202 that must be present within a rule 116 and default values for the rule conditions 202 that may be used if no user input 110 regarding the rule conditions 202 is received. In other implementations, condition constraints 314 may indicate one or more rule conditions 202 that must not or must not be used in combination with one or more other rule conditions 202. In still other implementations, condition constraints 314 may indicate one or more rule conditions 202 that must or must not be used in combination with one or more feature characteristics 204. Condition constraints 314 may also include correspondence between the user input 110 and one or more existing rules 116(1) stored in a rule repository 316. For example, correspondence between the user input 110 and the existing rules 116(1) may be used to ensure that it is not possible to satisfy the rule conditions 202 for multiple rules 116 simultaneously. In some implementations, if the user input 110 would cause generation of a new rule 116 having rule conditions 202 that may be simultaneously satisfied with the rule conditions 202 of an existing rule 116(1), the rule generation module 114 may provide one or more notifications 318, such as recommendation to merge the prospective new rule 116 with one or more existing rules 116(1) or to modify one or more of the new rule 116 or the existing rule(s) 116(1).

The constraint data 312 may also include one or more feature constraints 320. Feature constraints 320 may indicate one or more features that must be present within a webpage 102 and default feature characteristics 204 for the features that may be used if no user input 110 regarding the feature characteristics 204 is received. Feature constraints 320 may also indicate certain features or feature characteristics 204 that must be present, or must not be present, if certain other features or feature characteristics 204 are present. Feature constraints 320 may further indicate certain features or feature characteristics 204 that must be present, or must not be present, if certain rule conditions 202 are satisfied. For example, an elongated title associated with an item and an enlarged image of the item may overlap one another or be displayed improperly on the display of a mobile device. The feature constraints 320 may prevent generation of a rule 116 that would allow generation of a webpage 102 having both an elongated title and elongated image if the user device 108(2) attempting to access the webpage 102 has a display less than a threshold size. Feature constraints 320 may also prevent use of conflicting features, or generation of webpages 102 having identical sets of feature characteristics 204 to those of existing webpages 102, and so forth. For example, if the selected feature characteristics 304 are identical to those of an existing webpage 102, the rule generation module 114 may generate one or more notifications 318 suggesting merging of two or more rules 116 or modification of one or more of the rules 116.

Notifications 318 may also indicate other instances in which the user input 110 may not result in the generation of a rule 116 due to the constraint data 312. Notifications 318 may additional indicate instances where one or more of the selected feature characteristics 304 or selected rule conditions 310 were modified due to the constraint data 312 or were supplemented using one or more default values. In some implementations, notifications 318 may also be used to indicate particular feature characteristics 204 or rule conditions 202 associated with low or high historical use, a low or high conversion rate for selling items or generating user interactions, and so forth. For example, if a particular set of rule conditions 202 is not frequently satisfied by received requests 118, a notification 318 may suggest modification of one or more of the rule conditions 202. As another example, if a particular set of feature characteristics 204 does not historically cause user interactions or purchases of items, a notification 318 may suggest modification of one or more of the feature characteristics 204.

In some implementations, one or more notifications 318 may be provided to an administrator device 322 associated with a creator of a rule 116(1) that may conflict with the user input 110 provided by the user device 108(1). In other cases, notifications 318 may be provided to administrator devices 322 associated with the creators of particular constraints if the user input 110 violates one or more constraints.

If the user input 110 does not correspond to the constraint data 312, the rule generation module 114 may generate a rule 116(2) that may be stored in the rule repository 316 for future use. In some implementations, a layout associated with webpage 102 corresponding to the rule 116(2) may be generated and stored for future access, to enable the webpage 102 to be provided to a user device 108 efficiently.

In some implementations, the rule server 106 may also include an experiment module 324 that may be used to test the efficacy or other characteristics of a generated rule 116(2). For example, an experiment module 324 may generate an A/B test or another type of statistical analysis or experimental test to determine user interactions associated with presentation of a webpage 102 corresponding to the rule 116(2). The experiment module 324 may access experiment data 326 that may control the parameters of the experiment. For example, the experiment data 326 may control the percentage or type of users, user accounts, or user devices 108 that are provided with a webpage 102 corresponding to the rule 116(2). Other user devices 108 may be provided with webpages 102 that correspond to other rules 116 or that include default features and feature characteristics 204. The experiment data 326 may also control the length of time that the experiment is conducted. In some implementations, user input 110 may be used to at least partially control one or more experiment parameters. The experiment module 324 may receive user interactions associated with the webpages 102 that are presented to user devices 108 and at the time that the experiment ends, based on the user interactions, the generated rule 116(2) may be stored in the rule repository 316 for future use. In other cases, the webpage 102 associated with the generated rule 116(2) may be determined to be less effective than those associated with existing sets of feature characteristics 204, and a notification 318 may be provided to the user device 108(1) prompting modification or deletion of the rule 116 (2).

In some implementations, the rule generation module 114 or another module associated with one or more of the ruler server 106 or the web server 124 may provide one or more webpage previews 328 to the user device 108(1). The webpage previews 328 may indicate at least a portion of one or more webpages 102 that may be generated using the selected feature characteristics 304 associated with the rule 116(2). The webpage previews 328 may also include one or more preexisting or default features associated with particular webpages 102. For example, a first webpage preview 328 may depict a webpage 102 including the selected feature characteristics 304 that would be displayed in a first location, such as Saudi Arabia, that also includes one or more default characteristics specific to that location. A second webpage preview 328 may depict a webpage 102 including the selected feature characteristics 304 that would be displayed in a second location, such as Canada, that also includes one or more default characteristics specific to that location. Based on the webpage previews 328, a user may determine that certain feature characteristics 304 may be less effective when used in a location having a right-to-left linguistic preference, such as Saudi Arabia than when used in a location having a left-to-right linguistic preference, such as Canada. Responsive to this determination, the user may modify the selected feature characteristics 304 or the selected rule conditions 310. For example, a user may add a rule condition 310 to display a webpage 102 containing the selected feature characteristics 304 only if the device attempting to access the webpage 102 is located in one or more selected countries indicated in the rule condition 310.

Figure 4:
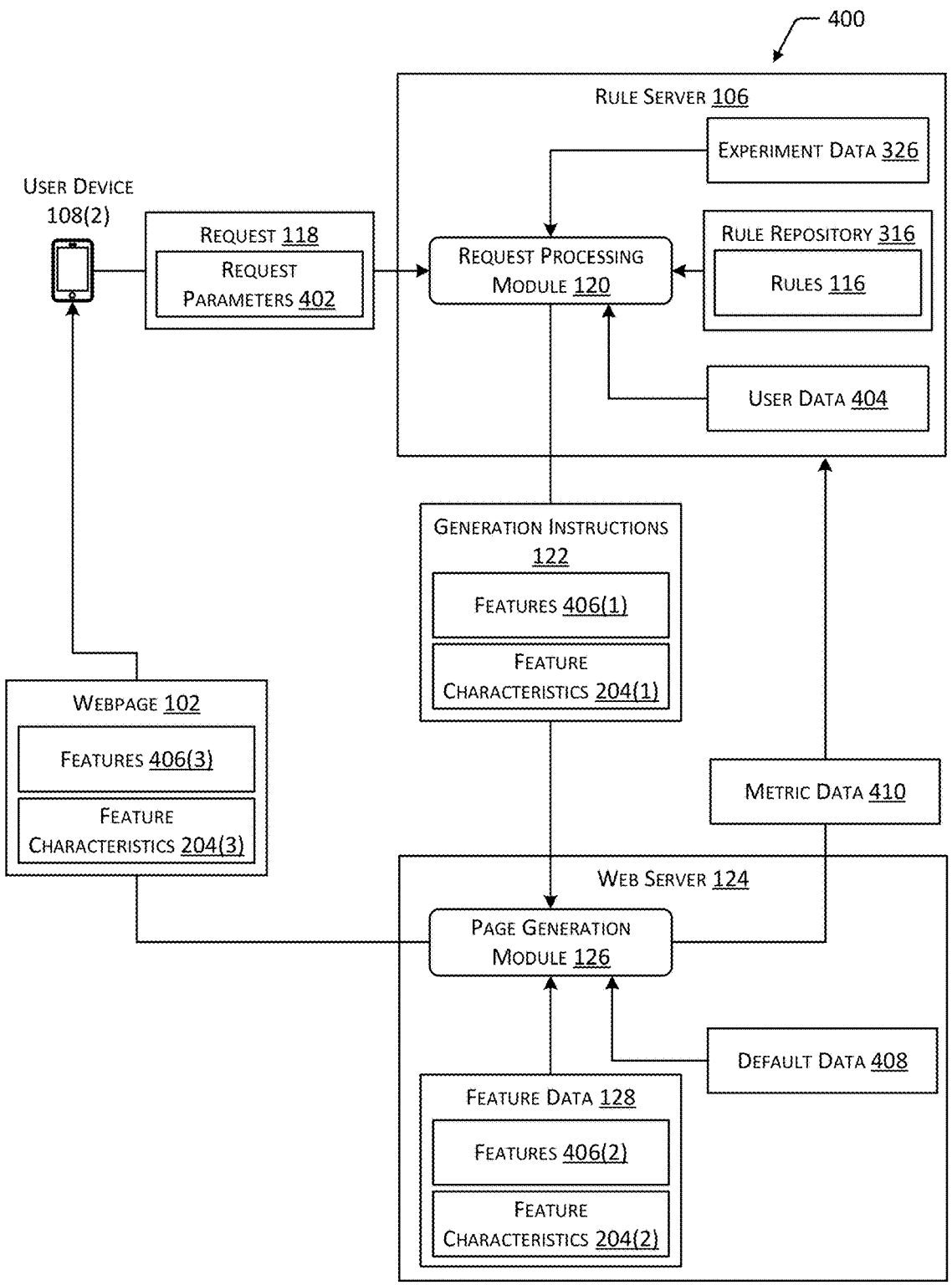
FIG. 4 is a block diagram depicting an implementation of a rule server and a web server within the present disclosure.

FIG. 4 is a block diagram 400 depicting one implementation of a rule server 106 and a web server 124 within the present disclosure. As described previously, while the rule server 106 and the web server 124 are depicted as separate components, in other implementations, the rule server 106 and web server 124 may include a single computing device or group of computing devices. Additionally, in other implementations, the rule server 106 may perform one or more functions described with regard to the web server 124, and the web server 124 may perform one or more functions described with regard to the rule server 106.

A request processing module 120 associated with the rule server 106 may receive a request 118 from one or more user devices 108(2). As discussed with regard to FIG. 1, while the rule server 106 and web server 124 are depicted as separate components, in other implementations, the functions described with regard to the rule server 106 and web server 124 may be performed using the same device or group of devices. Additionally, while FIG. 4 depicts a user device 108(2) providing a request 118 to the rule server 106, in other implementations, the user device 108(2) may provide the request 118 to the web server 124. The request 118 may include one or more request parameters 402. Request parameters 402 may include identifiers associated with the user device 108(2), a user account, or a user. Request parameters 402 may also include information regarding the user device 108(2), such as hardware components of the user device 108(2) or software components executing on the user device 108(2). Request parameters 402 may also include user account information, such as demographic or geographic information. Request parameters 402 may additionally include network identifiers associated with the user device 108(2), such as an internet protocol (IP) or media access control (MAC) address. Request parameters 402 may further include an indication or characteristics of one or more webpages 102 or other user interfaces that the user device 108(2) is requesting to access. In some implementations, one or more request parameters 402 may be determined from the request 118 itself. In other implementations, the request processing module 120 may access user data 404 associated with the user device 108(2) or a user account associated therewith. For example, the request 118 may indicate an identifier associated with the user device 108(2) or user account, and the request processing module 120 may determine correspondence between the identifier and the user data 404 to determine a corresponding user account. The request processing module 120 may then determine the request parameters 402 based on the corresponding user data 404.

The request processing module 120 may also access one or more rules 116 within a rule repository 316. The request processing module may further access experiment data 326 indicating the experiment parameters that apply to the rules 116. For example, if an experiment is currently being conducted for a particular rule 116, the experiment data 326 may indicate whether the particular rule 116 is to be applied to the request parameters 402 or whether one or more preexisting rules 116 are to be used. As discussed with regard to FIG. 2, a rule 116 may include one or more rule conditions 202 that are associated with one or more corresponding feature characteristics 204. The request processing module 120 may determine correspondence between at least a portion of the request parameters 402 and at least a portion of the rule conditions 202 of the rules 116 to determine whether each rule condition 202 of a particular rule 116 corresponds to the request parameters 402. If each rule condition 202 of a rule 116 is satisfied by the request 118, the request processing module 120 may determine the feature characteristics 204 that correspond to the satisfied rule conditions 202 and provide generation instructions 122 to the web server 124. The generation instructions 122 may include data indicative of particular features 406(1) and corresponding feature characteristics 204(1) to be included in the generated webpage 102, based on the rule 116 that corresponded to the request 118. The generation instructions 122 may be configured to cause a web server 124 to generate a webpage 102 that includes at least a portion of the features 406(1) and feature characteristics indicated in the generation instructions 122. In some implementations, the request processing module 120 may also access default data 408 indicative of one or more default features 406 or feature characteristics 204. For example, if a rule 116 does not indicate a particular feature 406, or if the rule 116 indicates a feature 406 but does not indicate feature characteristics 204 for the feature 406, the request processing module 120 may include an indication of one or more default features 406 or feature characteristics 204 in the generation instructions 122. In other implementations, the web server 124 may instead access default data 408 when generating a webpage 102. For example, if the generation instructions 122 do not indicate a particular feature 406 or feature characteristics 204 for an existing feature 406, the web server 124 may include default features 406 or default feature characteristics 204 in the webpage 102.

A page generation module 126 associated with the web server 124 may access the generation instructions 122 and in some implementations, the default data 408, to determine particular features 406 and feature characteristics 204 to be included in a webpage 102. The web server 124 may also access feature data 128, which may include data useable to generate a webpage 102 that includes various features 406(2) and feature characteristics 204(2) associated with the features 406(2). For example, the page generation module 126 may determine correspondence between the features 406(1) and feature characteristics 204(1) of the generation instructions 122 and the features 406(2) and feature characteristics 204(2) of the feature data 128 to determine a subset of features 406(3) and feature characteristics 204(3) for inclusion in the webpage. The page generation module 126 may generate the webpage 102 including the features 406(3) and feature characteristics 204(3) and provide the webpage 102 to the user device 108(2) associated with the request 118. In other implementations, the web server 124 may provide data useable to generate the webpage 102 to the user device 108(2), and the user device 108(2) may generate or render the webpage 102.

In some implementations, the page generation module 126 may provide metric data 410 to the rule server 106. The metric data 410 may indicate particular webpages 102, features 406, or feature characteristics 204 that were presented to a user device 108 and user interactions that were received responsive to the webpages 102, features 406, and feature characteristics 204. For example, metric data 410 may be used by the experiment module 324 to determine the effectiveness of particular rules 118 or sets of feature characteristics 204 compared to preexisting rules 118 or feature characteristics 204.

Figure 5:
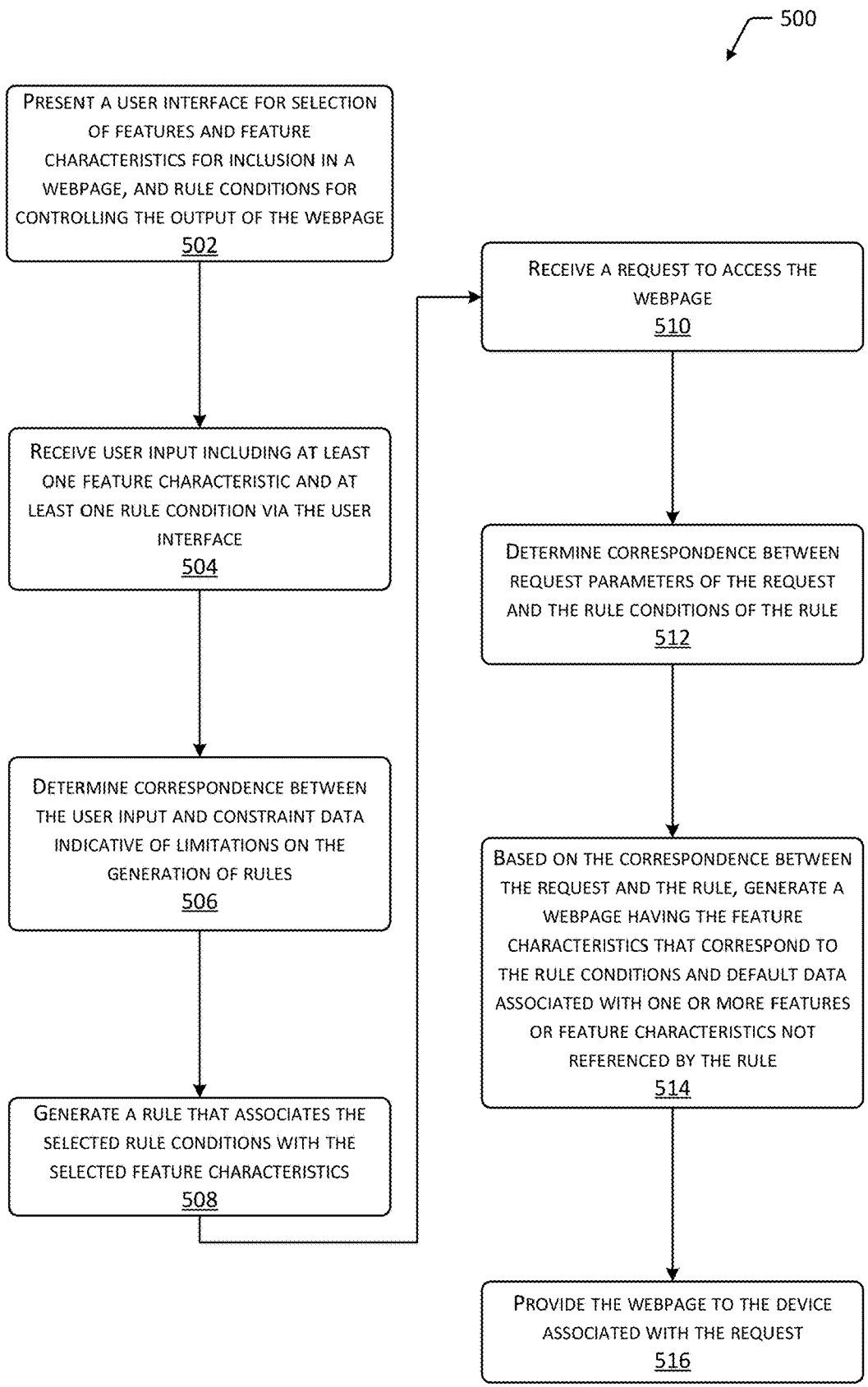
FIG. 5 is a flow diagram illustrating a method for generating a webpage based on a rule and providing the webpage to a user device.

FIG. 5 is a flow diagram 500 illustrating a method for generating a webpage 102 based on a rule 116 and providing the webpage 102 to a user device 108. Block 502 presents a user interface 104 for selection of features 406 and feature characteristics 204 for inclusion in a webpage 102, and rule conditions 202 for controlling output of the webpage 102. For example, the user interface 104 may include one or more of a list, a menu, a table, a search interface, or other mechanisms for displaying one or more features 406, and one or more feature characteristics 204 that correspond to the features 406. Features 404 may include elements of the webpage 102 for presenting alphanumeric data, image data, video data, and so forth. For example, a feature 406 may include a text block or image block. Feature characteristics 204 may include the dimensions, shape, color, font, or other elements of the style or size of the features 406. Continuing the example, the user interface 104 may enable a user to select from among multiple types of image blocks, each type of image block having a particular set of dimensions.

Block 504 receives user input 110 including at least one feature characteristic 204 and at least one rule condition 202, via the user interface 104. For example, user input 110 may include an indication of one or more features 406, an indication of one or more feature characteristics 204 for a selected feature 406 or a preexisting feature 406, and an indication of one or more rule conditions 202. In some cases, the user input 110 may not indicate a particular feature 406, and the resulting webpage 102 may include one or more default features 406. In other cases, the user input 110 may not indicate particular feature characteristics 204, and the webpage 102 may include default feature characteristics 204 for one or more selected features 406 or default features 406. In still other cases, the user input 110 may not indicate particular rule conditions 202, and the rule 116 created based on the user input 110 may include one or more default rule conditions 202.

Block 506 determines correspondence between the user input 110 and constraint data 312 indicative of limitations on the generation of rules 116. For example, constraint data 312 may include one or more condition constraints 314 and one or more feature constraints 320 that indicate particular combinations of features 406, feature characteristics 204, and rule conditions 202 that may not be present in a rule 116, or that must be present in a rule 116 if other particular features 406, feature characteristics 204, or rule conditions 202 are present. Continuing the example, determining correspondence between the user input 110 and constraint data 312 may include determining that the rule conditions 202 of the user input 110 and the rule conditions 202 for an existing rule 116 may not be simultaneously satisfied by a single request 118. As another example, correspondence between the user input 110 and constraint data 312 may indicate that the user input 110 did not include a required feature 404, such as a price or item title, which may result in the generation of one or more notifications 318. As yet another example, correspondence between the user input 110 and constraint data 312 may indicate that a particular feature characteristic 204 may not be include in a webpage 102 if a combination of other features 406 and feature characteristics 204 are included. As another example, correspondence between the user input 110 and constraint data 312 may indicate that a particular feature 406 and feature characteristic 204 must be present in a rule 116 if another particular feature 406, feature characteristic 204, or rule condition 202 is present.

Block 508 generates a rule 116 that associates the selected rule conditions 202 of the user input with the selected feature characteristics 204. As described with regard to FIG. 2, rule conditions 202 may be associated with user device hardware 206, user device software 208, connection metric data 210, user account data 212, or webpage characteristics 214. For example, rule conditions 202 may indicate particular hardware components of a user device 108, such as a type of display, speaker, haptic element, and so forth. Rule conditions may indicate particular software components executing on the user device 108, such as a particular type of operating system, browser application, screen reader, text-to-speech application, and so forth. Rule conditions 202 may indicate particular characteristics of a connection with the user device 108, such as latency, a packet error rate, a data throughput value, and so forth. Rule conditions 202 may also indicate characteristics of a user account, such as an association with one or more user groups or programs, a purchase history or indication regarding whether a user account has previously purchased an item associated with the webpage 102, demographic information regarding a user, and so forth. Rule conditions 202 may further indicate characteristics of the webpage 102, such as a type or category associated with items presented on the webpage 102. A rule 116 may include any number and any type of rule conditions 202, which may be stored in association with any number and any type of feature characteristics 204.

In some implementations, a layout, list of features 406 or feature characteristics 204, an indication of the output of a satisfied rule 116 or other characteristics associated with a webpage 102 may be precomputed. The precomputed data may be based on the feature characteristics 204 of the rule 116, default data 408 associated with one or more features 406 or feature characteristics 204 not referenced by the rule 116, or a combination of selected feature characteristics 204 and default data 408. The precomputed data associated with webpage 102 may be stored for future access to reduce the latency associated with generation of the webpage 102. In other implementations, a webpage 102 may be generated responsive to a request 118 if the request parameters 402 correspond to the rule conditions 202 of an existing rule 116.

Block 510 receives a request 118 to access the webpage 102. As described with regard to FIG. 4, a request 118 may include one or more request parameters 402, or one or more request parameters 402 may be determined based on correspondence between the request 118 and user data 404. For example, based on one or more identifiers, network addresses, or other identifying information determined based on the request 118, user data 404 associated with the user device 108 or user account providing the request may be determined. In other cases, request parameters 402, such as hardware components, software components, connection metric data, user account data, or webpage characteristics may be determined based on the request 118, itself.

Block 512 determines correspondence between the request parameters 402 associated with the request 118 and the rule conditions 202 of the rule 116. For example, a rule 116 may indicate particular user device hardware 206, user device software 208, connection metric data 210, user account data 212, or webpage characteristics 214. At least a portion of this information may be determined from the request 118 or from user data 404 that corresponds to the request 118. If the request parameters 402 correspond to each rule condition 202 of a rule 116, a webpage 102 that corresponds to the rule 116 may be provided to the user device 108 associated with the request 118. If the request parameters 402 do not correspond to an existing rule 116, a default webpage 102 or other response may be provided to the user device 108.

Block 514 generates a webpage 102 that includes the feature characteristics 204 that correspond to the rule conditions 202 of the rule 116. In some implementations, one or more feature characteristics 204 of the webpage 102 may also be determined based on default data 418. In cases where a layout or other portions of a webpage 102 were precomputed, block 514 may include using the precomputed data to generate at least a portion of the webpage 102. Block 516 provides the webpage 102 to the device associated with the request 118. In other implementations, data useable to generate the webpage 102 may be provided to the user device 108 associated with the request 118, and the user device 108 may generate the webpage 102 based on the data.

Figure 6:
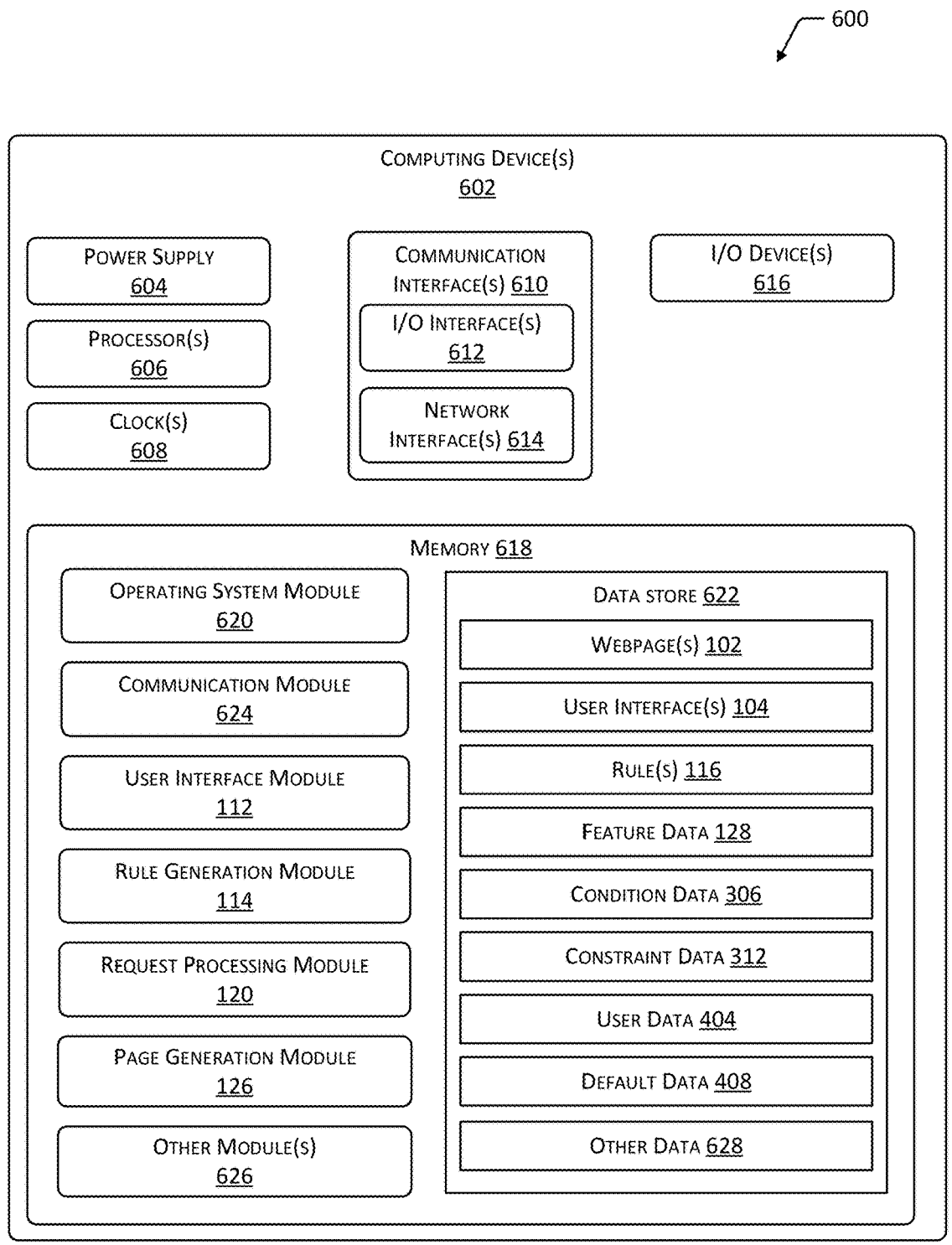
FIG. 6 is a block diagram illustrating a computing device within the present disclosure.

FIG. 6 is a block diagram 600 illustrating a computing device 602 within the present disclosure. While FIG. 6 depicts a single computing device 602, in other implementations, the functions described with regard to the computing device 602 may be performed by any number and any type of computing devices 602. For example, the computing device 602 may include any combination of rule servers 106, web servers, 124, user devices 108, or other computing devices 602 in communication therewith. Continuing the example, in some implementations, a user device 108 may generate rules 118 based on user input 110 provided by a user and may transmit the rules 118 or data indicative of the rules 118 to a rule server 106. In other implementations, a user device 108 may provide user input 110 or data indicative of user input 110 to the rule server 106, which may generate a rule 118 based on the user input 110. As another example, in some implementations, a user device 108 may receive generation instructions 122 or other data indicative of a webpage 102 including one or more feature characteristics 204, and the user device 108 may generate the webpage 102. In other implementations, a web server 124 may generate a webpage 102 based on the generation instructions 122 and provide the webpage 102 to the user device 108. Any combination of functions described herein may be performed by any combination of rule servers 106, web servers 124, user devices 108, or other computing devices 602 in communication therewith.

One or more power supplies 604 may be configured to provide electrical power suitable for operating the computing device 602. In some implementations, the power supply 604 may include a rechargeable battery, fuel cell, photovoltaic cell, power conditioning circuitry, and so forth.

The computing device 602 may include one or more hardware processor(s) 606 (processors) configured to execute one or more stored instructions. The processor(s) 606 may include one or more cores. One or more clocks 608 may provide information indicative of date, time, ticks, and so forth. For example, the processor(s) 606 may use data from the clock 608 to generate a timestamp, trigger a preprogrammed action, and so forth.

The computing device 602 may include one or more communication interface(s) 610, such as input/output (I/O) interface(s) 612, network interface(s) 614, and so forth. The communication interfaces 610 may enable the computing device 602, or components of the computing device 602, to communicate with other computing devices 602 or components thereof. The I/O interface(s) 612 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 612 may couple to one or more I/O device(s) 616. The I/O devices 616 may include any manner of input device or output device associated with the computing device 602 or with another computing device 602 in communication therewith. For example, I/O devices 616 may include touch sensors, keyboards, mouse devices, microphones, image sensors (e.g., cameras), scanners, displays, speakers, haptic devices, printers, motion sensors, location sensors, and so forth. In some implementations, the I/O device(s) 616 may be physically incorporated with a computing device 602 or may be externally placed.

The network interface(s) 614 may be configured to provide communications between the computing device 602 and other devices, such as the I/O devices 616, routers, access points, and so forth. The network interface(s) 614 may include devices configured to couple to one or more networks, including local area networks (LANs), wireless LANs, wide area networks (WANs), wireless WANs, and so forth. For example, the network interfaces 614 may include computing devices 602 compatible with Ethernet, Wi-Fi®, Wi-Fi Direct®, Bluetooth®, Bluetooth® Low Energy, ZigBee®, Z-Wave®, 3G, 4G, LTE, and so forth.

The computing device 602 may include one or more busses or other internal communications hardware or software that allows for the transfer of data between the various modules and portions of the computing device 602.

As shown in FIG. 6, the computing device 602 may include one or more memories 618. The memory 618 may include one or more computer-readable storage media (CRSM). The CRSM may be any one or more of an electronic storage medium, a magnetic storage medium, an optical storage medium, a quantum storage medium, a mechanical computer storage medium, and so forth. The memory 618 may provide storage of computer-readable instructions, data structures, program modules, and other data for the operation of the computing device 602. A few example modules are shown stored in the memory 618, although the same functionality may alternatively be implemented in hardware, firmware, or as a system on a chip (SoC).

The memory 618 may include one or more operating system (OS) modules 620. The OS module 620 may be configured to manage hardware resource devices such as the I/O interfaces 612, the network interfaces 614, the I/O devices 616, and to provide various services to applications or modules executing on the processors 606. The OS module 620 may implement a variant of the FreeBSD™ operating system as promulgated by the FreeBSD® Project; UNIX® or a UNIX-like operating system; a variation of the Linux™ operating system as promulgated by Linus Torvalds; the Windows® operating system from Microsoft Corporation of Redmond, Wash., USA; or other operating systems.

A data store 622 and one or more of the following modules may also be stored in the memory 618. The modules may be executed as foreground applications, background tasks, daemons, and so forth. The data store 622 may use a flat file, database, linked list, tree, executable code, script, or other data structure to store information. In some implementations, the data store 622 or a portion of the data store 622 may be distributed across one or more other devices including other computing devices 602, network attached storage devices, and so forth.

A communication module 624 stored in the memory 618 may be configured to establish communications with or other computing devices 602.

The memory 618 may also store the user interface module 112. The user interface module 112 may be configured to provide one or more user interfaces 104 to other computing devices 602. The user interface(s) 104 may include indications of one or more features 406, feature characteristics 204, and rule conditions 202, which may be determined based at least in part on feature data 128 and condition data 306 stored in the data store 622. The user interface module 112 may also be configured to receive user input 110 indicating particular rule conditions 202 and feature characteristics 204.

The memory 618 may additionally store the rule generation module 114. The rule generation module 114 may generate one or more rules 116 based on the user input 110 received by the user interface module 112. For example, a rule 116 may include one or more rule conditions 202 that are associated with one or more corresponding feature characteristics 204, such that if a request 118 corresponds to each rule condition 202 of a rule 116, a webpage 102 that includes the corresponding feature characteristics 204 may be generated. In some implementations, the rule generation module 114 may access constraint data 306 to validate one or more of the user input 110 or the rules 116. For example, constraint data 306 may indicate one or more rule conditions 202, features 406, or feature characteristics 204 that must be present, or must not be present, under certain circumstances. In some implementations, if the user input 110 does not correspond to the constraint data 306, one or more notifications 318 may be generated indicating possible modifications to the rule conditions 202 or feature characteristics 204. In other implementations, if the user input 110 does not correspond to the constraint data 306, the rule generation module 114 may access default data 408 and generate a rule 116 that includes one or more default rule conditions 202 or feature characteristics 204.

The memory 618 may further store the request processing module 120. The request processing module 120 may receive requests 118 to access webpages 102 and may determine correspondence between request parameters 402 of the requests 118 and the existing rules 116. For example, at least a portion of the request parameters 402 may correspond to rule conditions 202 of at least a portion of the rules 116. If the request parameters 402 correspond to each rule condition 202 of a rule 116, then the request processing module 120 may produce generation instructions 122 to cause a webpage 102 that includes the corresponding feature characteristics 204 to be generated. If the request parameters 402 do not correspond to each rule condition 202 of any existing rule 116, then the request processing module 120 may cause a webpage 102 that includes default features 406 and feature characteristics 204 to be generated. In some implementations, at least a portion of the request parameters 402 may be determined based on user data 404. For example, a request 118 may include one or more identifiers or other data from which a user device 108 or user account may be determined. The request processing module 120 may determine user data 404 that corresponds to the identifiers and may determine the request parameters 402 based on the corresponding user data 404.

The memory may store the page generation module 126. The page generation module 126 may generate a webpage 102 based on generation instructions 122 produced by the request processing module 120. The generation instructions 122 may include data indicative of one or more features 406 and feature characteristics 204. The page generation module 126 may determine a portion of feature data 128 that corresponds to the generation instructions 122 and generate a webpage 102 based at least in part on the corresponding feature data 128. In some implementations, the page generation module 126 may generate at least a portion of the webpage 102 based on default data 408. For example, if the generation instructions 122 do not indicate particular features 406 or do not indicate feature characteristics 204 for an existing feature 406, a default feature 406 or default feature characteristic 204 may be used.

Other modules 626 may also be present in the memory 618. For example, other modules 626 may include notification modules configured to generate and provide notifications 318 to user devices 108 to facilitate the generation of rules 116. Continuing the example, a notification module may provide recommendations based on combinations of features 406 or feature characteristics 204 that result in greater quantities of user interactions with webpages 102. As another example, a notification module may provide recommendations based on combinations of rule conditions 202 that would result in a quantity of access to a webpage 102 less than a threshold quantity. Other modules 626 may also include metric modules that determine the particular rule conditions 202 that are satisfied by requests 118 and the particular webpages 102 that are generated, and store metric data indicative of the webpages 102 that are accessed. The metric data may be used to generate subsequent recommendations or notifications 318. Other modules 626 may further include encryption modules to encrypt and decrypt communications between computing devices 602. Configuration modules to receive and modify user settings, configurations, and preferences, default settings, the content of the user interfaces 104 or notifications 318, and so forth.

Other data 628 within the data store 622 may include default configurations and settings associated with computing devices 602. Other data 628 may also include security data, such as encryption keys and schema, access credentials, and so forth. Other data 628 may further include stored notifications 318.

In different implementations, different computing devices 602 may have different capabilities or capacities. For example, content servers 110 may have significantly more processor 606 capability and memory 618 capacity compared to the processor 606 capability and memory 618 capacity of user devices 106.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
   one or more memories storing computer-executable instructions; and
   one or more hardware processors to execute the computer-executable instructions to:
   access a first rule at a first time, wherein the first rule includes one or more first rule conditions;
   provide a user interface to a first user device, wherein the user interface includes a plurality of feature characteristics for features of a webpage and a plurality of rule conditions;
   at a second time after the first time, receive user input indicative of at least one feature characteristic of the plurality of feature characteristics and one or more second rule conditions of the plurality of rule conditions;
   determine an absence of a conflict between the one or more first rule conditions and the one or more second rule conditions by determining that it is not possible for a single request to satisfy both the one or more first rule conditions and the one or more second rule conditions;
   in response to determining that it is not possible for a single request to satisfy the one or more first rule conditions and the one or more second rule conditions, generate a second rule based on the user input, wherein the second rule associates the at least one feature characteristic of the user input with the one or more second rule conditions of the user input;

receive a request to access the webpage from a second user device;

determine at least one request parameter based at least in part on the request, wherein the at least one request parameter is indicative of one or more of:
at least one characteristic of the second user device;
at least one characteristic of a connection with the second user device;
at least one characteristic of a user account associated with the second user device;
one or more applications executing on the second user device; or
at least one characteristic of the webpage;

determine correspondence between the at least one request parameter and the one or more second rule conditions of the second rule; and based on the correspondence between the at least one request parameter and the one or more second rule conditions, cause the webpage including the at least one feature characteristic to be output by the second user device.

2. The system of claim 1, wherein the at least one feature characteristic includes one or more of:
a dimension of a first feature;
a location of the first feature within the webpage; or
a location of the first feature relative to a second feature of the webpage.

3. The system of claim 1, further comprising computer-executable instructions to:
determine, based on correspondence between the second rule and webpage data indicative of a set of features associated with the webpage, at least one feature of the set of features that is not associated with the at least one feature characteristic of the second rule; and
provide the webpage with one or more default feature characteristics that correspond to the at least one feature.

4. The system of claim 1, further comprising computer executable instructions to:
access constraint data indicative of one or more first feature characteristics of the plurality of feature characteristics and one or more second feature characteristics of the plurality of feature characteristics, wherein each first feature characteristic of the one or more first feature characteristics mitigates presentation of at least one second feature characteristic of the one or more second feature characteristics; and
based on correspondence between the at least one feature characteristic of the user input and the constraint data, provide a notification to the first user device indicating the at least one feature characteristic and a corresponding second feature characteristic of the one or more second feature characteristics.

5. A method comprising:
at a first time, accessing a first rule associated with one or more first rule conditions for causing presentation of a first version of a webpage;
receiving first user input that indicates one or more first feature characteristics for inclusion in a second version of the webpage;
at a second time after the first time, receiving second user input that indicates one or more second rule conditions that correspond to the one or more first feature characteristics;
determining correspondence between the one or more first rule conditions and the one or more second rule conditions;
based on the correspondence between the one or more first rule conditions and the one or more second rule conditions, generating a second rule that associates the one or more first feature characteristics with the one or more second rule conditions;
receiving a request to access the webpage;
in response to correspondence between one or more characteristics of the request and the one or more second rule conditions, providing access to the second version of the webpage that includes at least one feature having the one or more first feature characteristics; and
in response to non-correspondence between the one or more characteristics of the request and the one or more second rule conditions, providing access to one or more of the first version or a third version of the webpage.

6. The method of claim 5, further comprising:
receiving one or more second feature characteristics for inclusion in the third version of the webpage;
receiving one or more third rule conditions that correspond to the one or more second feature characteristics;
generating a third rule that associates the one or more second feature characteristics with the one or more third rule conditions; and
determining correspondence between the one or more characteristics of the request and the one or more third rule conditions, wherein access is provided to the third version of the webpage in response to the correspondence between the one or more characteristics of the request and the one or more third rule conditions.

7. The method of claim 5, further comprising:
determining latency of a connection with a device providing the request;
wherein the one or more first rule conditions include a first quantity of latency, the one or more second rule conditions include a second quantity of latency greater than the first quantity, and the one or more first feature characteristics include a data size less than one or more second feature characteristics associated with the first rule.

8. The method of claim 5, further comprising:
generating and storing data indicative of the first version of the webpage responsive to the generating of the first rule;
generating and storing data indicative of the second version of the webpage responsive to the generating of the second rule; and
based on the correspondence between the one or more characteristics of the request and the one or more second rule conditions, accessing the data indicative of the second version of the webpage and generating the webpage based at least partially on the data indicative of the second version.

9. The method of claim 5, further comprising:
based on the request, determining at least one characteristic associated with a user device providing the request, wherein the at least one characteristic includes one or more of a hardware component associated with the user device or an application associated with the user device;
wherein the one or more second rule conditions indicate one or more of at least one hardware component or at least one software component.

10. The method of claim 5, wherein the webpage indicates an item available for purchase, the method further comprising:
- based on the request, determining at least one characteristic associated with a user account associated with the request, wherein the at least one characteristic includes one or more of: demographic information associated with a user, a category associated with the user account, or an indication of a previous purchase of the item associated with the user account;
- wherein the one or more second rule conditions indicate one or more of: at least one demographic characteristic, at least one category, or the indication of the previous purchase.

11. The method of claim 5, further comprising:
- generating one or more experiment parameters associated with the second rule, wherein the one or more experiment parameters indicate a subset of recipients for the first version of the webpage; and
- responsive to the request, determining correspondence between the request and the one or more experiment parameters, wherein the correspondence between the one or more characteristics of the request and the one or more second rule conditions is determined responsive to the correspondence between the request and the one or more experiment parameters.

12. A system comprising:
- one or more memories storing computer-executable instructions; and
- one or more hardware processors to execute the computer-executable instructions to:
  - receive, via a user interface, user input indicating: at least one first rule condition and at least one first feature characteristic for inclusion in a first version of a webpage;
  - determine correspondence between the user input and constraint data, wherein the constraint data indicates one or more of:
    - at least one second feature characteristic to be included in the webpage when the at least one first feature characteristic is included; or
    - at least one third feature characteristic to be excluded from the webpage when the at least one first feature characteristic is included;
  - determine, based on the correspondence, one or more of:
    - the user input further includes the at least one second feature characteristic; or
    - the user input excludes the at least one third feature characteristic;
  - based on the correspondence between the user input and the constraint data, generate a first rule associating the at least one first feature characteristic with the at least one first rule condition; and
  - based on correspondence between a request to access the webpage and the first rule, provide access to one of the first version of the webpage or a second version of the webpage.

13. The system of claim 12, further comprising computer-executable instructions to:
- determine that a count of requests associated with the at least one first rule condition is less than a threshold count; and
- in response to the count of requests being less than the threshold count, generate a notification indicative of one or more of: a modification to the first version, a modification to the first rule, or deletion of the first version.

14. The system of claim 12, further comprising computer-executable instructions to:
- receive, via the user interface, user input indicating at least one second feature characteristic for inclusion in the second version of the webpage and at least one second rule condition; and
- generate a second rule associating the at least one second feature characteristic with the at least one second rule condition.

15. The system of claim 12, further comprising computer-executable instructions to:
- determine one or more features included in the webpage;
- determine a mismatch between the at least one first feature characteristic of the first rule and at least one feature of the one or more features; and
- based on the mismatch, include, in the first version, at least one default feature characteristic associated with the at least one first feature.

16. The system of claim 12, further comprising computer-executable instructions to:
- prior to receiving the request, generate and store data indicative of the first version of the webpage; and
- based on correspondence between the request and the first rule, access the data indicative of the first version of the webpage and generate the first version of the webpage based at least in part on the data indicative of the first version of the webpage.

17. The system of claim 12, wherein the at least one first rule condition includes an indication that data indicative of the first version of the webpage has been previously generated and stored, the system further comprising computer-executable instructions to:
- prior to receiving the request, generate and store data indicative of the first version of the webpage including the at least one first feature characteristic;
- responsive to receiving the request, determine that the data indicative of the first version of the webpage has been generated; and
- responsive to determination that the data indicative of the first version of the webpage has been generated, generate the first version of the webpage and provide the first version of the webpage to a device associated with the request.

18. The system of claim 12, wherein the at least one first rule condition includes a threshold quantity of latency, the system further comprising computer-executable instructions to:
- determine a quantity of latency of a connection associated with the request;
- determine that the quantity of latency is less than the threshold quantity of latency; and
- responsive to the quantity of latency being less than the threshold quantity, provide the first version of the webpage to a device associated with the request.

19. The system of claim 12, further comprising computer-executable instructions to:
- determine, based on the request, one or more of:
  - a characteristic of a device providing the request;
  - a characteristic of a user account associated with the request; or
  - a characteristic of the webpage;
- wherein the at least one first rule condition includes the one or more of the characteristic of the device, the characteristic of the user account, or the characteristic of the webpage.

20. The system of claim 12, the system further comprising computer-executable instructions to:

at a first time, access a second rule associated with one or more second rule conditions, wherein the user input is received at a second time after the first time; and determine correspondence between the at least one first rule condition and the one or more second rule conditions, wherein the first rule is further generated in response to the correspondence between the at least one first rule condition and the one or more second rule conditions.

\* \* \* \* \*